United States Patent [19]

Nagano

[11] Patent Number: 5,243,879
[45] Date of Patent: Sep. 14, 1993

[54] CRANK AXLE UNIT FOR A BICYCLE
[75] Inventor: Masashi Nagano, Izumi, Japan
[73] Assignee: Shimano Inc., Osaka, Japan
[21] Appl. No.: 705,543
[22] Filed: May 24, 1991
[30] Foreign Application Priority Data May 2, 1991 [JP] Japan .................. 3-030778[U]

[51] Int. Cl.$^5$ .................................. G05G 1/14
[52] U.S. Cl. .................. 74/594.2; 74/594.1; 280/259
[58] Field of Search ............. 74/594.1–594.3, 74/594.4; 280/259, 260, 261; 474/69, 70

[56] References Cited

U.S. PATENT DOCUMENTS

| 3,578,829 | 5/1971 | Hata .................. 74/594.1 X |
| 3,903,754 | 9/1975 | Morroni .............. 74/594.1 |
| 4,093,325 | 6/1978 | Troccaz .............. 74/594.1 X |
| 4,545,691 | 10/1985 | Kastan et al. ....... 74/594.1 X |
| 4,576,503 | 3/1986 | Drain ................ 74/594.1 X |
| 4,651,590 | 3/1987 | Thun ................. 74/594.4 X |
| 5,024,121 | 6/1991 | Hsieh ................ 74/594.1 |

FOREIGN PATENT DOCUMENTS

| 2647424 | 4/1977 | Fed. Rep. of Germany ..... 74/594.1 |
| 2830494 | 1/1979 | Fed. Rep. of Germany ..... 280/259 |
| 3706167 | 9/1988 | Fed. Rep. of Germany ..... 74/594.1 |
| 623094 | 10/1926 | France ................ 74/594.1 |
| 1252564 | 12/1960 | France ................ 74/594.1 |
| 2357326 | 3/1978 | France ................ 74/594.1 |
| 1-180393 | 12/1989 | Japan ................. 74/594.1 |
| 1384462 | 3/1988 | U.S.S.R. .............. 74/594.1 |
| 145153 | 3/1919 | United Kingdom ....... 74/594.1 |

Primary Examiner—Vinh T. Luong
Attorney, Agent, or Firm—Dickstein, Shapiro & Morin

[57] ABSTRACT

A crank axle unit mounted in a bottom bracket assembled to a bicycle frame, which crank axle unit has a tubular element surrounding and rotatably supporting a crank axle, the tubular element being surrounded by the bottom bracket, and a first screw ring and a second screw ring screwed into opposite ends of the bottom bracket for positioning and fixing the tubular element in the bottom bracket. The first screw ring is fitted on an outside wall in one end region of the tubular element, and includes a threaded portion for screwing to an inside wall in one end region of the bottom bracket, and tool engaging teeth provided on an inside wall at an outward end of the first screw ring. The second screw ring is fitted on an outside wall in the other end region of the tubular element, and includes a threaded portion for screwing to an inside wall in the other end region of the bottom bracket, and tool engaging teeth provided on an inside wall at an outer end of the second screw ring. The engaging teeth of the two screw rings are arranged at different pitches, but are engageable with the same tool.

5 Claims, 6 Drawing Sheets

CRANK AXLE UNIT FOR A BICYCLE

BACKGROUND OF THE INVENTION

1. Field of the Invention

The present invention relates to a crank axle unit mounted in a bottom bracket assembled to a bicycle frame, and to the technique of positioning and fixing this unit to the bottom bracket. In particular, the invention relates to a crank axle unit comprising a tubular element surrounding and rotatably supporting a crank axle, and a fixing device for positioning and fixing the tubular element in the bottom bracket.

2. Description of the Related Art

A crank axle unit as noted above is disclosed in Japanese Utility Model Publication Kokai No. 1989-180393, for example. This crank axle unit includes a first screw ring for fitting to an outside wall of one end region of a tubular element and screwing to an inside wall of one end region of a bottom bracket, and a second screw ring for fitting to an outside wall of the other end region of the tubular element and screwing to an inside wall of the other end region of the bottom bracket. The two screw rings have grooves defined on outer peripheries thereof to act as engaging portions engageable with a screwing tool. That is, the screw rings are turned by a tool acting on the outer peripheries thereof.

According to this construction, these engaging portions have extended axial lengths to allow the screw rings to be turned until the screw rings are screwed into the bottom bracket to extents corresponding to predetermined lengths for assembly purposes, and to prevent deformation of the engaging portions of the screw rings due to the reaction to turning and tightening of the screw rings to the limits. Consequently, the screw rings project to relatively large extents from the bottom brackets when the screw rings are assembled to the bottom bracket as designed. Front gears and cranks must therefore be located at relatively remote positions laterally of the bottom bracket to be out of contact with the screw rings.

SUMMARY OF THE INVENTION

An object of the present invention is to provide an improved crank axle unit for a bicycle which includes screw rings having tool engaging portions not easily deformable when the screw rings are screwed to required extents into a bottom bracket, with the screw rings extending only slightly, if at all, from the bottom bracket, and an improved technique of assembling the crank axle unit to a bicycle frame.

In order to achieve the above object, the present invention provides a crank axle unit of the type noted at the outset hereof comprising a first screw ring including a first tool engaging device formed on an inside wall at an outward end thereof, and a second screw ring including a second tool engaging device formed on an inside wall at an outward end thereof.

When screwing the first and second screw rings into the bottom bracket with a tightening tool, the tool acts on the engaging device formed on the inside wall of each screw ring. It is therefore possible even to insert each screw ring completely into the bottom bracket as necessary. This allows front gears and cranks attached to the crank axle to be disposed inwardly toward the bottom bracket, i.e. toward the bicycle frame. Even then, sufficiently large areas of interaction between the engaging devices and tool may be secured to avoid deformation of the engaging devices due to a reaction to the tightening force.

In a preferred embodiment of the present invention, the first screw ring is formed of a metal and the second screw ring formed of plastic, the first and second engaging devices comprising teeth formed on the inside walls of the first and second screw rings, respectively, the pitch of the teeth of the first engaging device being a product of the pitch of the teeth of the second tool engaging device multiplied by an integer (i.e. twice or more). For this crank axle unit, a tightening tool may be prepared which includes opposite teeth arranged on an outside wall thereof at the pitches of the teeth of the second engaging device, the opposite teeth being shaped such that a plurality of opposite teeth fit into a region between adjacent teeth of the first engaging device. Then, although the same tool is used, the second screw ring formed of a weak material may be tightened by means of a force-acting area several times larger than when tightening the first screw ring. This feature allows the configuration of each tool engaging device to be determined in an optimal way where the two screw rings having different material strengths are used.

Other objects and features of this invention will be apparent from the following description made with reference to the accompanying drawings.

DETAILED DESCRIPTION OF THE PREFERRED EMBODIMENT

Figure 1:
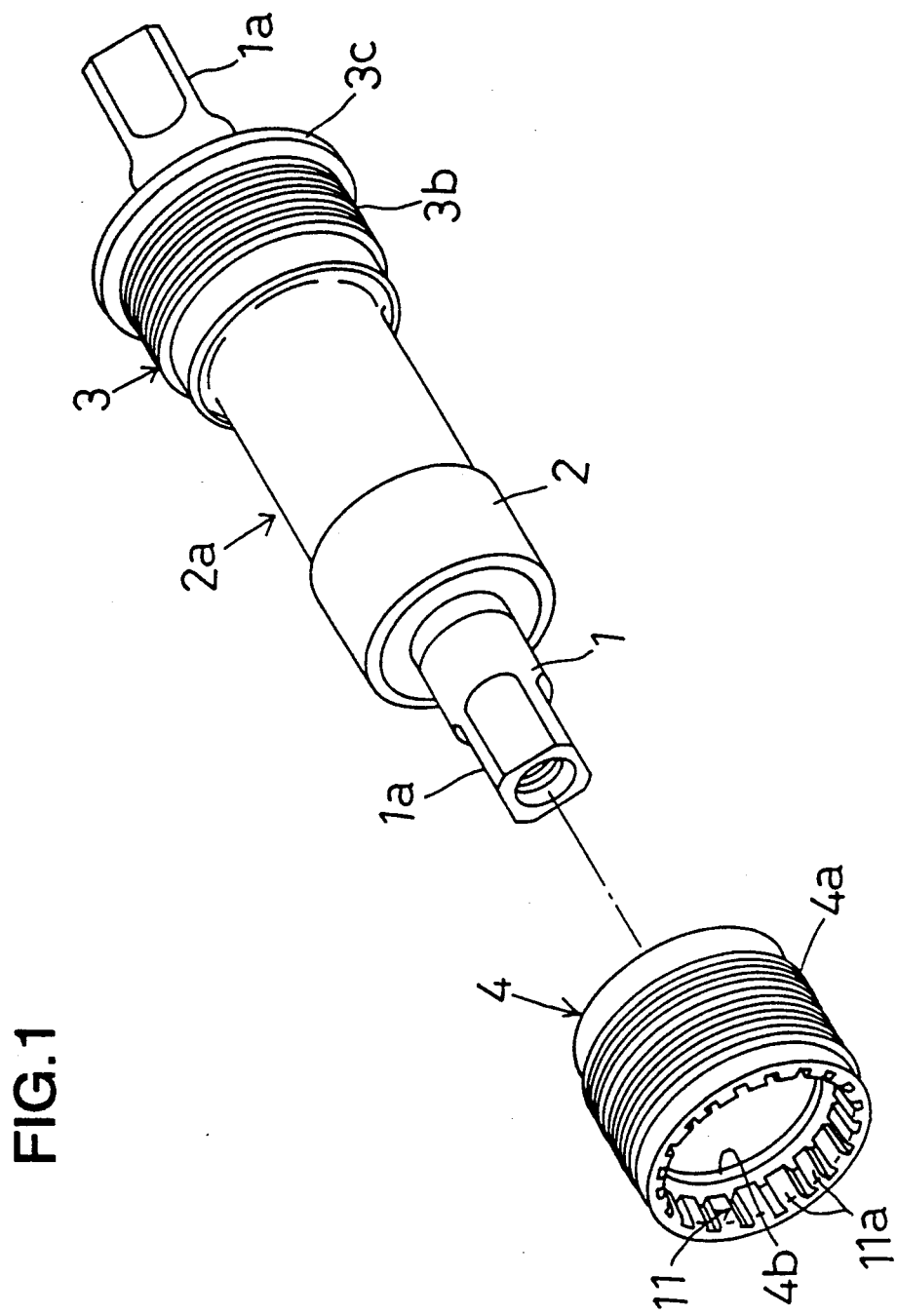
FIG. 1 is a perspective view of a crank axle unit according to the present invention.
Figure 2:
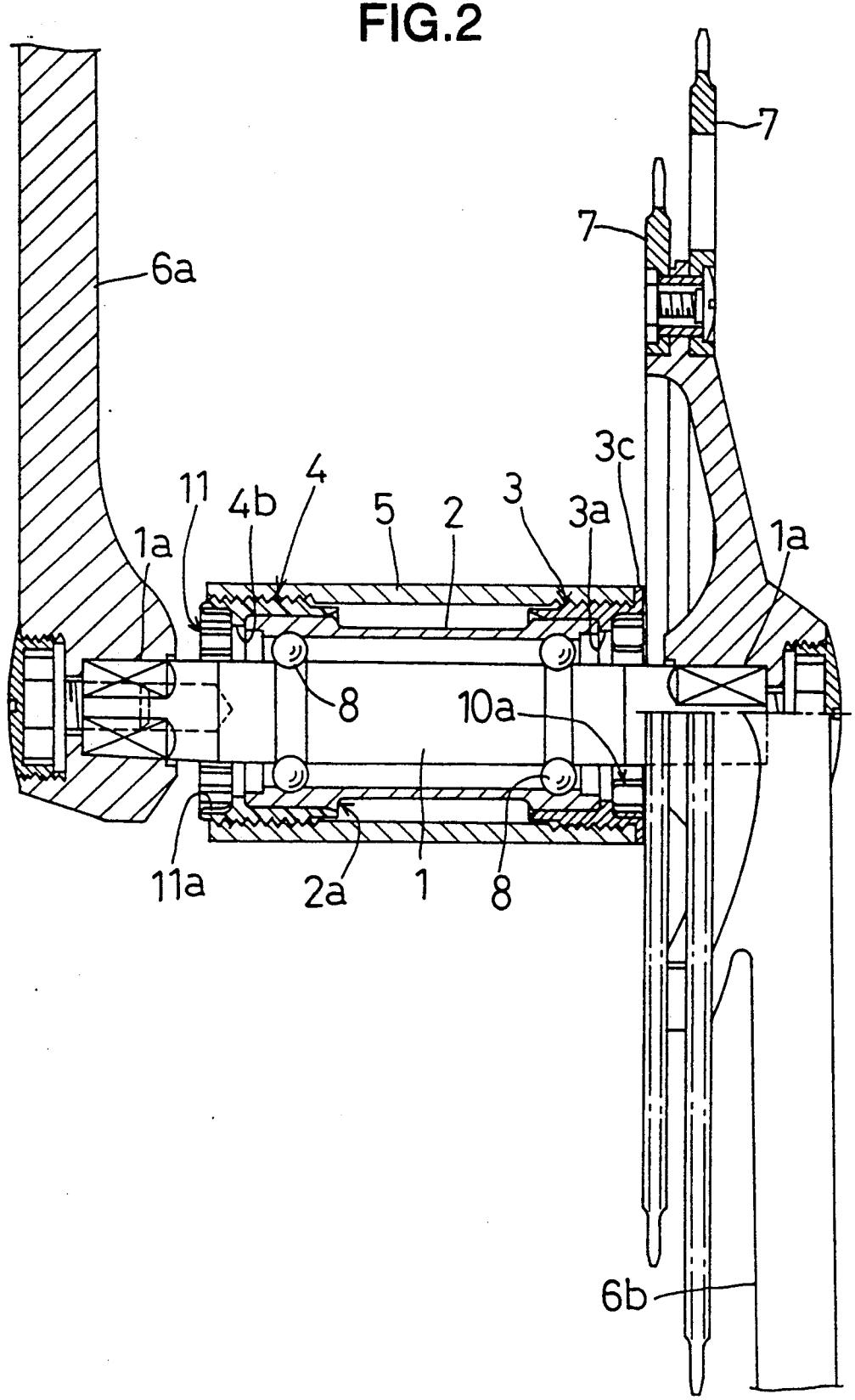
FIG. 2 is a sectional view of the crank axle unit in an assembled position.

As shown in FIG. 1, a crank axle unit for a bicycle comprises a unit body including a crank axle 1 and a tubular element 2, and a first screw ring 3 and a second screw ring 4 mounted on opposite ends of the tubular element 2. This crank axle unit is assembled to a bicycle frame by means of a bottom bracket 5 as shown in FIG. 2. The crank axle 1 carries right and left cranks 6a and 6b on opposite ends, and front gears 7 on one end thereof.

The crank axle 1 extends through the tubular element 2 and is rotatably supported therein through balls 8. The crank axle 1 is positioned and retained relative to the tubular element 2 by cooperation of these balls 8 and ring grooves defined circumferentially of the crank axle 1 to receive the balls 8. The opposite ends of the crank axle 1 define crank connections 1a in form of square shafts to which the cranks 6a and 6b are attached for turning together with the crank axle 1. The tubular element 2 defines an annular groove 2a peripherally of an intermediate region thereof for reducing its weight.

The first screw ring 3 includes an annular stopper 3a projecting from an inside wall thereof, and a flange-shaped abutment 3c projecting from an outside wall at an outer end of the first screw ring 3. Further, the first screw ring 3 includes a threaded portion 3b defined over a substantial length peripherally thereof. The first screw ring 3 is fitted to the tubular element 2 to the extent that the stopper 3a contacts an end face of the tubular element 2, and securely fixed to the tubular element 2 such as by press fit. The tubular element 2 is in engagement through the threaded portion 3b of the first screw ring 3 with a threaded portion formed on an inside wall at one end of the bottom bracket 5. The first screw ring 3 is positioned relative to the bottom bracket 5 by the abutment 3c.

The second screw ring 4 securely fitted on the other end of the tubular element 2 defines a threaded portion 4a peripherally and substantially over an entire length thereof to be engageable with an inside wall at the other end of the bottom bracket 5. The second screw ring 4 also includes a stopper 4b projecting inwardly from an inside wall thereof. The stopper 4b is cooperable with an end face of the tubular element 2 to positively maintain the tubular element 2 between the first screw ring 3 and second screw ring 4. That is, the first screw ring 3 fixed to the crank axle unit body is screwed into the bottom bracket 5 from the side at which the front gears 7 are mounted, until the abutment 3c of the first screw ring 3 contacts the end face of the bottom bracket 5. The second screw ring 4 with the inside wall fitted on the tubular element 2 is screwed into the bottom bracket 5 until the stopper 4b contacts the other end face of the tubular element 2. In this way, the crank axle unit is correctly positioned relative to and positively fixed to the bottom bracket 5.

Figure 3:
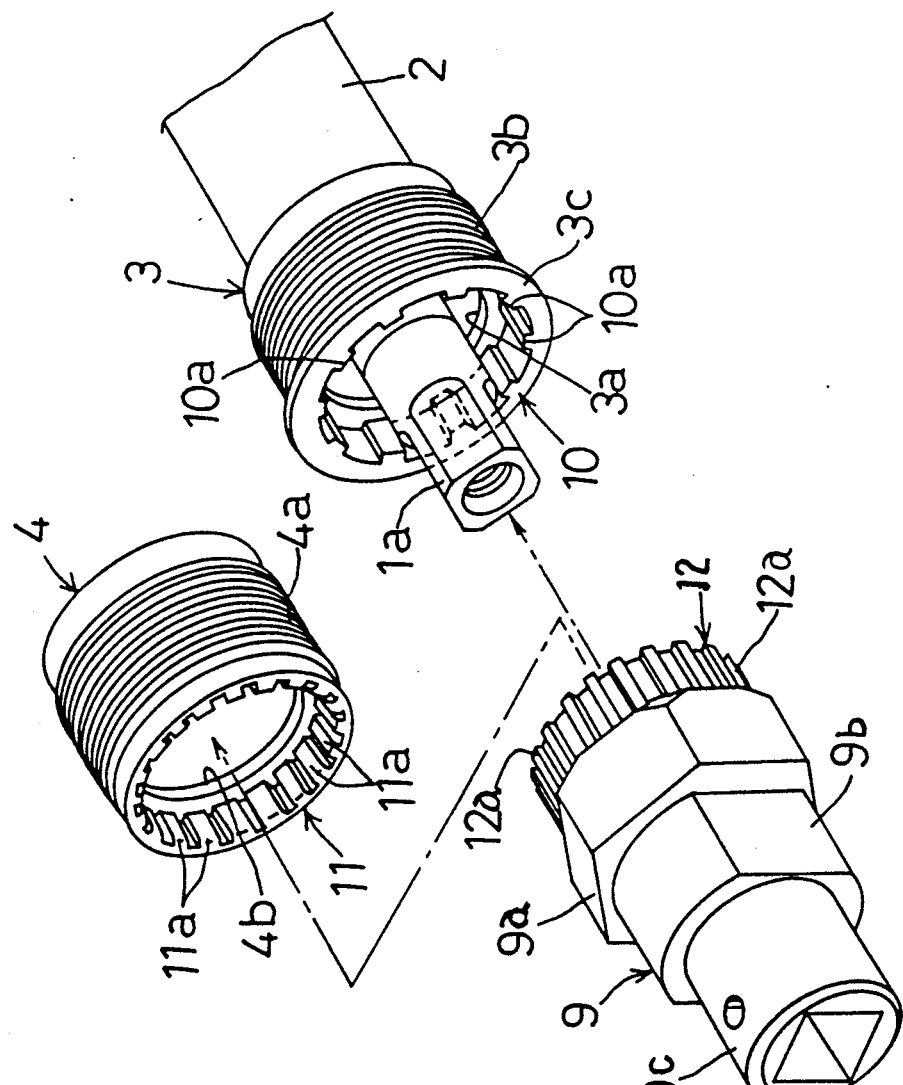
FIG. 3 is a perspective view of a screwing tool.
Figure 4:
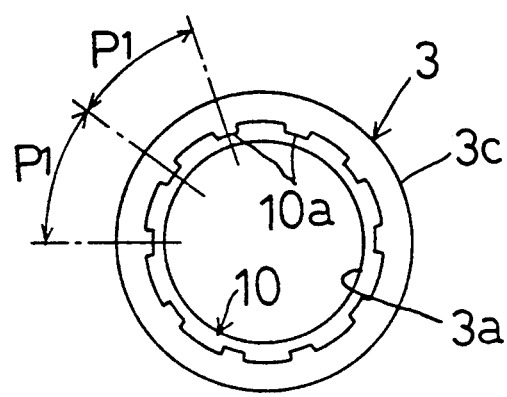
FIG. 4 is an end view of a first screw ring.
Figure 5:
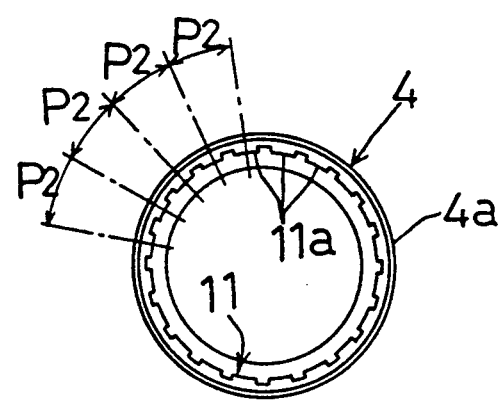
FIG. 5 is an end view of a second screw ring.
Figure 6:
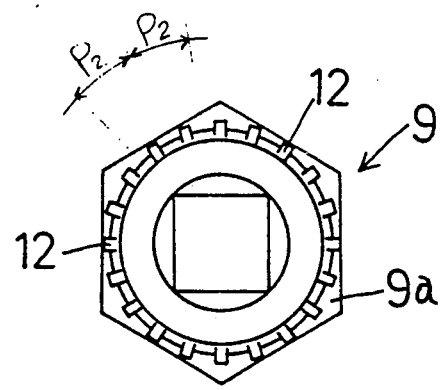
FIG. 6 is an end view of the tool.

As shown in FIG. 3, the first and second screw rings 3 and 4 include a first and a second engaging portions 10 and 11 defined on inside walls in end regions thereof, respectively, on which a screwing tool 9 acts to screw the two screw rings 3 and 4 into the bottom bracket 5. The first engagement portion 10 includes a plurality of projections or teeth 10a arranged at pitches P1 circumferentially of the first screw ring 3 as shown in FIG. 4. The second engagement portion 11 includes a plurality of projections or teeth 11a arranged at pitches P2 circumferentially of the second screw ring 4 as shown in FIG. 5. The tool 9 has a tubular portion 12 for acting on the screw rings, which includes a plurality of projections or teeth 12a arranged at the same pitches P2 as in the second screw ring 4 circumferentially on an outside wall of the tubular portion 12. When the force-applying portion 12 of the tool 9 is inserted into a bore of the screw ring 3 or 4, the teeth of the force-applying portion 12 enter bottom regions between the teeth of the screw ring 3 or 4, with the teeth of the screw ring 3 or 4 entering bottom regions between the teeth of the force-applying portion 12, whereby the screw ring 3 or 4 may positively be screwed tight with the tool 9. As particularly described later, the pitches and shapes of the teeth 12 of the tool 9 and the teeth 10a and 11a of the two ring screws 3 and 4 are suitably determined, so that the same tool 9, that is the teeth 12a of the same force-applying portion 12 may be used to screw tight the screw rings 3 and 4.

The abutment 3c of the first screw ring 3 must have a small axial length to minimize the extent to which the first screw ring 3 project from the bottom bracket 5 because of the abutment 3c and allow the crank 6b and front gears 7 to be arranged as inwardly as possible. In spite of this, the abutment 3c must have a sufficient strength for position setting through contact with the bottom bracket 5. For this purpose and for securing a sufficient strength in the front gear region, the first screw ring 3 is formed of a metal, for example. On the other hand, the second screw ring 4 which may be less strong than the first screw ring 3 is formed of plastic, for example, to be as light as possible and manufactured at low cost. The pitch P1 is the product of the pitch P2 multiplied by an integer, so that the number of teeth 11a of the second screw ring 4 corresponds to the product of the number of teeth 10a of the first screw ring 3 multiplied by the integer.

Further, the teeth 10a, 11a and 12a have such shaped that one of the teeth 12a fits into a space between two adjacent teeth 11a while a plurality of teeth 12a fit into a space between two adjacent teeth 10a. This relationship will be described in outline with reference to FIG. 7.

Figure 7:
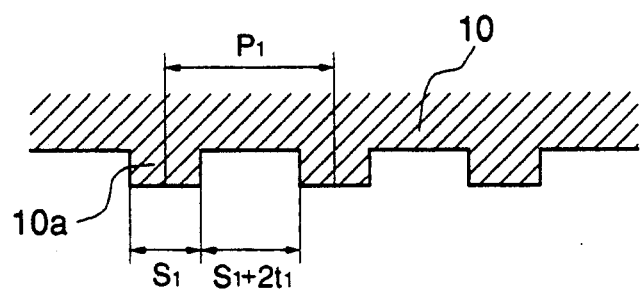
FIG. 7 is a schematic development showing a relationship between tool engaging portions of the first and second screw rings and an opposed engaging portion of the tool.
Figure 7:
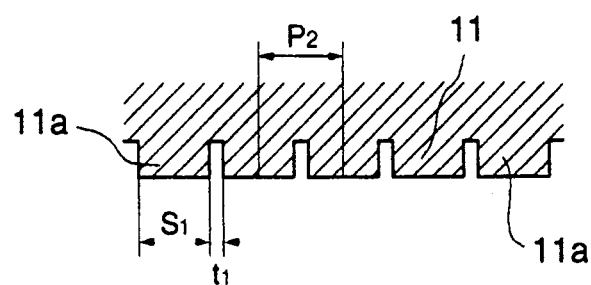
Figure 7:
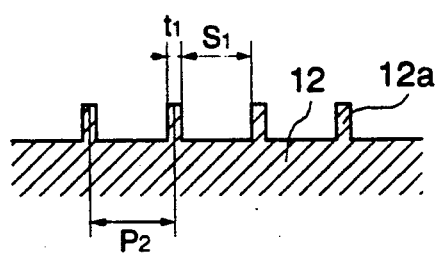

For simplicity, FIG. 7 shows the pitch P1 of the teeth 10a of the first screw ring 3 being twice the pitch P2 of the teeth 11a of the second screw ring 4. In this example, the engagement portion 11 of the second screw ring 4 meshes with the opposite engagement portion or force-applying portion 12 of the tool 9 as an ordinary gear pair. That is, a tooth 12a has a length t1 substantially corresponding to that of a tooth bottom between adjacent teeth 11a, and a tooth 11a has a length S1 substantially corresponding to that of a tooth bottom between adjacent teeth 12a. A tooth 10a of the first screw ring 3 has a length substantially corresponding to the length S1 of the tooth bottom between adjacent teeth 12a. A tooth bottom between adjacent teeth 12a of the first screw ring 3 has a length substantially corresponding to S1+2t1 which is the sum of the length S1 of the tooth bottom between teeth 12a and twice the length t1 of a tooth 12a.

Consequently, although the same tool 9, i.e. the same force-applying portion 12, is used, the second screw ring 4 may be tightened by means of larger engagement areas than the first screw ring 3. In other words, use is made of maximum engageable areas available on the respective screw rings 3 and 4. The first screw ring 3 includes only a necessary number of teeth to avoid an undue increase in manufacturing cost and to secure the largest possible distance between adjacent teeth for facility of removal of earth and dust accumulating therein.

Further, in the crank axle unit according to the present invention, one of the threaded portions 3b and 4a of the first and second gear rings 3 and 4 is formed as a right-handed screw and the other a left-handed screw so that the screw rings 3 and 4 do not readily become loose with rotation of the crank axle 1.

The screw rings 3 and 4 are constructed such that the engagement portion 10 or 11 where teeth 10a or 11a are defined has an inside diameter exceeding an outside diameter of an inward end of a boss of the crank 6a or 6b. This construction allows the inward ends of the bosses of the cranks to enter the engagement portions 10 and 11, so that cranks 6a and 6b and front gears 7 are located inwardly with respect to the bicycle frame.

Figure 8:
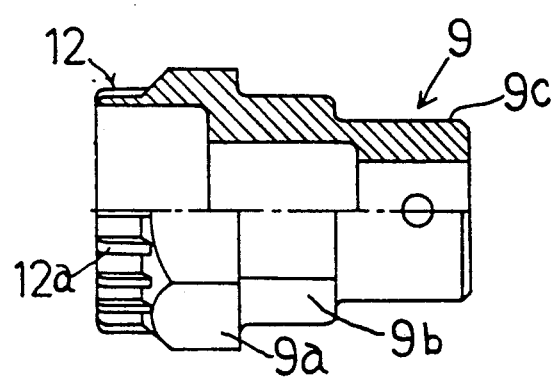
FIG. 8 is a sectional view of the tool.
Figure 9:
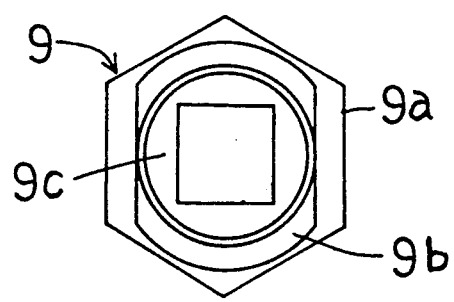
FIG. 9 is an end view of the tool.

As shown in FIGS. 8 and 9, the tool 9 may advantageously comprise a first tightening portion 9a having a hexagon section, a second tightening portion 9b having a track-shaped section, for engaging a wrench or a spanner, and a third tightening portion 9c defining a square bore for engaging a pneumatic screw driver.

What is claimed is:

1. A crank axle unit to be mounted in a bottom bracket assembled to a bicycle frame, comprising:
   a tubular element surrounding and rotatably supporting a crank axle, said tubular element being surrounded by said bottom bracket when mounted in said bottom bracket, and
   fixing means for positioning and fixing said tubular element in said bottom bracket, said fixing means including:
   a first screw ring fitted on an outside wall in a first end region of said tubular element for screwing to an inside wall of said bottom bracket in a first end region of said bottom bracket,
   an abutment projecting radially defined on an outer end of said first screw ring for contacting with an end of said bottom bracket adjacent said first end region of said bottom bracket, whereby a relative position of said screw ring to said bottom bracket is secured,
   a first tool engaging means provided on an inside wall of said first screw ring at said outer end,
   a second screw ring fitted on an outside wall in a second end region of said tubular element for screwing to said inside wall of said bottom bracket in a second end region of said bottom bracket, said entire second screw ring being screwable into said bottom bracket, and
   second tool engaging means provided on an inside wall of said second screw ring at an outer end.

2. A crank axle unit as claimed in claim 1, wherein said first tool engaging means includes a first plurality of teeth on said inside wall of said first screw ring, wherein said second tool engaging means includes a second plurality of teeth on said inside wall of said second screw ring.

3. A crank axle unit as claimed in claim 2, wherein said first screw ring and said second screw rings are formed of the same material, and wherein a pitch of said first plurality of teeth and a pitch of said second plurality of teeth are the same.

4. A crank axle unit as claimed in claim 2, wherein said first screw ring and said second screw rings are formed of the different materials, and wherein a pitch of said first plurality of teeth and a pitch of said second plurality of teeth are different.

5. A crank axle unit to be mounted in a bottom bracket assembled to a bicycle frame, comprising:
   a tubular element surrounding and rotatably supporting a crank axle, said tubular element being surrounded by said bottom bracket when mounted in said bottom bracket, and
   fixing means for positioning and fixing said tubular element in said bottom bracket, said fixing means including:
   a metal first screw ring fitted on an outside wall in a first end region of said tubular element for screwing to an inside wall of said bottom bracket in a first end region of said bottom bracket,
   a first tool engaging means provided on an inside wall of said first screw ring at said outer end, said first tool engaging means including teeth on said inside wall of said first screw ring,
   a plastic second screw ring fitted on an outside wall in a second end region of said tubular element for screwing to said inside wall of said bottom bracket in a second end region of said bottom bracket, and
   second tool engaging means provided on an inside wall of said second screw ring at an outer end, said second tool engaging means including a second plurality of teeth on said inside wall of said second screw ring,
   wherein the pitch of the teeth of said first tool engaging means is a product of the pitch of the teeth of said second tool engaging means multiplied by an integer.

* * * * *

REEXAMINATION CERTIFICATE (3156th)

United States Patent [19]

Nagano

[11] B1 5,243,879

[45] Certificate Issued Mar. 11, 1997

[54] CRANK AXLE UNIT FOR A BICYCLE

[75] Inventor: Masashi Nagano, Izumi, Japan

[73] Assignee: Shimano Inc., Sakai, Japan

Reexamination Request:
No. 90/003,954, Sep. 11, 1995

Reexamination Certificate for:
Patent No.: 5,243,879
Issued: Sep. 14, 1993
Appl. No.: 705,543
Filed: May 24, 1991

[30] Foreign Application Priority Data

May 2, 1991 [JP] Japan ............... 3-030778 U

[51] Int. Cl.$^6$ ..................... G05G 1/14
[52] U.S. Cl. ............ 74/594.2; 74/594.1; 280/259
[58] Field of Search ............ 74/594.1–594.4; 280/259–261; 474/69, 70; 384/510–514, 458, 431

[56] References Cited

U.S. PATENT DOCUMENTS 4,233,741  8/1993  Maynard ................. 29/266
5,209,581  5/1993  Nagano .................. 384/545
5,363,721  11/1994 Hsiao .................... 74/594.1

OTHER PUBLICATIONS

Advertisement, "Phil Sealed Crankbearing" (No date).

*Primary Examiner*—Vinh T. Luong

[57] ABSTRACT

A crank axle unit mounted in a bottom bracket assembled to a bicycle frame, which crank axle unit has a tubular element surrounding and rotatably supporting a crank axle, the tubular element being surrounded by the bottom bracket, and a first screw ring and a second screw ring screwed into opposite ends of the bottom bracket for positioning and fixing the tubular element in the bottom bracket. The first screw ring is fitted on an outside wall in one end region of the tubular element, and includes a threaded portion for screwing to an inside wall in one end region of the bottom bracket, and tool engaging teeth provided on an inside wall at an outward end of the first screw ring. The second screw ring is fitted on an outside wall in the other end region of the tubular element, and includes a threaded portion for screwing to an inside wall in the other end region of the bottom bracket, and tool engaging teeth provided on an inside wall at an outer end wall of the second screw ring. The engaging teeth of the two screw rings are arranged at different pitches, but are engageable with the same tool.

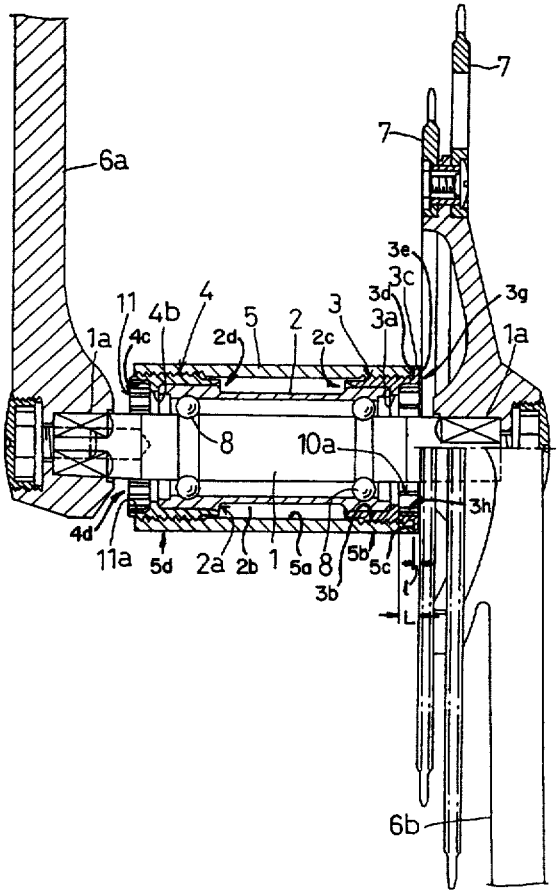

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 67 through column 3, line 62:

The first screw ring 3 includes an annular stopper 3a projecting from an inside wall thereof, and a flange-shaped abutment 3c projecting from an outside wall at an outer end 3g of the first screw ring 3. *As shown in FIG. 4, abutment 3c has a continuous circular outer peripheral surface 3f.* Further, the first screw ring 3 includes a threaded portion 3b defined over a substantial length peripherally thereof. The first screw ring 3 is fitted [to] *on an outside wall 2b in a first end region 2c of* the tubular element 2 to the extent that the stopper 3a contacts an end face of the tubular element 2, and securely fixed to the tubular element 2 such as by press fit. The tubular element 2 is in engagement through the threaded portion 3b of the first screw ring 3 with a threaded portion formed on an inside wall 5a at one end 5b of the bottom bracket 5. The first screw ring is positioned relative to the bottom bracket 5 by *an end surface 3d of* the abutment 3c *contacting an end face 5c of bottom bracket 5*.

The second screw ring 4 securely fitted on [the other end of] *the outside wall 2b in a second end region 2d of* the tubular element 2 defines a threaded portion 4a peripherally and substantially over an entire length thereof to be engageable with [an] *the* inside wall 5a *of the bottom bracket 5* at the other end 5d *of the bottom bracket 5*. *Second screw ring 4 includes unthreaded portions 4e and 4f at opposite ends thereof.* The second screw ring 4 also includes a stopper 4b projecting upwardly from an inside wall thereof. The stopper 4b is cooperable with an end face of the tubular element 2 to positively maintain the tubular element 2 between the first screw ring 3 and second screw ring 4. That is, the first screw ring 3 fixed to the crank axle unit body is screwed into the bottom bracket 5 from the side at which the front gears 7 are mounted, until the abutment 3c of the first screw ring 3 contacts the end face 5c of the bottom bracket 5. The second screw ring 4 with the inside wall fitted on the tubular element 2 is screwed *entirely* into the bottom bracket 5 until the stopper 4b contacts the other end face of the tubular element 2 *as shown in FIG. 2*. In this way, the crank axle unit is correctly positioned relative to and positively fixed to the bottom bracket 5.

As shown in FIG. 3, the first and second screw rings 3 and 4 include a first and a second engaging portions 10 and 11 defined on inside walls 3h,4c in end regions 3g,4d thereof, respectively, on which a screwing tool 9 acts to screw the two screw rings 3 and 4 into the bottom bracket 5. The first engagement portion 10 includes a plurality of projections or teeth 10a arranged at pitches P1 circumferentially of the first screw ring 3 as shown in FIG. 4. *As shown in FIG. 2, a length L of teeth 10a is greater than a length l between the inner end surface 3d and an outer end surface 3e of abutment 3c.* The second engagement portion 11 includes a plurality of projections or teeth 11a arranged at pitches P2 circumferentially of the second screw ring 4 as shown in FIG. 5. The tool 9 has a tubular portion 12 for acting on the screw rings, which includes a plurality of projections or teeth 12a arranged at the same pitches P2 as in the second screw ring 4 circumferentially on an outside wall of the tubular portion 12. When the force-applying portion 12 of the tool 9 is inserted into a bore of the screw ring 3 or 4, the teeth of the force-applying portion 12 enter bottom regions between the teeth of the screw ring 3 or 4, with the teeth of the screw ring 3 or 4 entering bottom regions between the teeth of the force-applying portion 12, whereby the screw ring 3 or 4 may positively be screwed tight with the tool 9. As particularly described later, the pitches and shapes of the teeth 12 of the tool 9 and the teeth 10a and 11a of the two ring screws 3 and 4 are suitably determined, so that the same tool 9, that is the teeth 12a of the same force-applying portion 12 may be used to screw tight the screw rings 3 and 4.

THE DRAWING FIGURES HAVE BEEN CHANGED AS FOLLOWS:

New referential numerals 4e and 4f are added in FIG. 1; 4c, 2d, 2c, 3d, 3e, 3g, 4d, 5d, 2b, 5a–5c, 3b, 3h, l and L are added in FIG. 2; 3f is added in FIG. 4. Further, two vertical parallel lines extending down from element numeral 3b; there is a gap between the shorter line and the sprocket 7, and two sets of double headed arrows are added in FIG. 2.

AS A RESULT OF REEXAMINATION, IT HAS BEEN DETERMINED THAT:

The patentability of claim 5 is confirmed.

Claims 1–3 are cancelled.

Claim 4 is determined to be patentable as amended.

New claims 6–17 are added and determined to be patentable.

4. [A crank axle unit as claimed in claim 2,] *A crank axle unit to be mounted in a bottom bracket (5) assembled to a bicycle frame, comprising:*

*a tubular element (2) surrounding and rotatably supporting a crank axle (1), said tubular element (2) being surrounded by said bottom bracket (5) when mounted in said bottom bracket (5), and*

*fixing means (3,4) for positioning and fixing said tubular element (2) in said bottom bracket (5), said fixing means (3,4) including:*

*a first screw ring (3) fitted on an outside wall (2b) in a first end region (2c) of said tubular element (2) for screwing to an inside wall (5a) of said bottom bracket (5) in a first end region (5b) of said bottom bracket (5),*

*an abutment (3c) projecting radially defined on an outer end (3g) of said first screw ring (3) for contacting with an end face (5c) of said bottom bracket (5) adjacent said first end region (5b) of said bottom bracket (5), whereby a relative position of said screw ring (3) to said bottom bracket (5) is secured,* a first tool engaging means (10) provided on an inside wall (3h) of said first screw ring (3) at said outer end (3g), wherein said first tool engaging means (10) includes a first plurality of teeth (10a) on said inside wall (3h) of said first screw ring (3);

a second screw ring (4) fitted on the outside wall (2b) in a second end region (2d) of said tubular element (2) for screwing to said inside wall (5a) of said bottom bracket (5) in a second end region (5d) of said bottom bracket (5), said entire second screw ring (4) being screwable into said bottom bracket (4), and second tool engaging means (11) provided on an inside wall (4c) of said second screw ring (4) at an outer end (4d), wherein said second tool engaging means (11) includes a second plurality of teeth (11a) on said inside wall (4c) of said second screw ring (4); wherein said first screw ring (3) and said second screw [rings] ring (4) are formed of [the] different materials, and wherein a pitch (P1) of said first plurality of teeth (10) and a pitch (P2) of said second plurality of teeth (11) are different.

6. A crank axle unit mounted in a bottom bracket (5) assembled to a bicycle frame, comprising:

a tubular element (2) surrounding and rotatably supporting a crank axle (1), said tubular element (2) being surrounded by said bottom bracket (5), and fixing means (3,4) for positioning and fixing said tubular element (2) in said bottom bracket (5), said fixing means (3,4) including:

a first screw ring (3) fitted on an outside wall (2b) of said tubular element (2) in a first end region (2c) of said tubular element (2) and screwed to an inside wall (5a) of said bottom bracket (5) in a first end region (5b) of said bottom bracket (5), an abutment (3c) projecting radially defined on an outer end (3g) of said first screw ring (3) and contacting with an end face (5c) of said bottom bracket (5) adjacent said first end region (5b) of said bottom bracket (5), whereby a relative position of said first screw ring (3) to said bottom bracket (5) is secured, a first tool engaging means (10) provided on an inside wall (3h) of said first screw ring (3) at said outer end (3g), a second screw ring (4) fitted on the outside wall (2b) of said tubular element (2) in a second end region (2d) of said tubular element (2) and screwed to said inside wall (5a) of said bottom bracket (5) in a second end region (5d) of said bottom bracket (5), said second screw ring (4) being screwed entirely into said bottom bracket (5), and second tool engaging means (11) provided on an inside wall (4c) of said second screw ring (4) at an outer end (4d) thereof.

7. A crank axle unit as claimed in claim 6, wherein said abutment (3c) is flange-shaped.

8. A crank axle unit as claimed in claim 7, wherein said first screw ring (3) is formed as a separate ring fitted between said tubular element (2) and said inside wall (5a) of said bottom bracket (5).

9. A crank axle unit as claimed in claim 7, wherein a length (L) of said first tool engaging means (10) is greater than a length (l) of said abutment (3c) between an inner end surface (3d) and an outer end surface (3e) thereof.

10. A crank axle unit as claimed in claim 9, wherein said inner end surface (3d) contacts an entire circumference of said end face (5c) of said bottom bracket (5).

11. A crank axle unit as claimed in claim 10, wherein said first screw ring (3) is formed as a separate ring fitted between said tubular element (2) and said inside wall (5a) of said bottom bracket (5).

12. A crank axle unit as claimed in claim 7, wherein said abument (3c) includes an inner end surface (3d) oriented perpendicularly to a threaded portion (3b) of said first screw ring (3) which is screwed to said inside wall (5a) of said bottom bracket (5).

13. A crank axle unit as claimed in claim 12, wherein said inner end surface (3d) contacts an entire circumference of said end face (5c) of said bottom bracket (5).

14. A crank axle unit as claimed in claim 7, wherein said abutment (3c) includes an outer end surface (3e) oriented perpendicularly to a threaded portion (3b) of said first screw ring (3) which is screwed to said inside wall (5a) of said bottom bracket (5).

15. A crank axle unit as claimed in claim 7, wherein said abutment (3c) includes:

an inner end surface (3d) oriented perpendicularly to a threaded portion (3b) of said first screw ring (3) which is screwed to said inside wall (5a) of said bottom bracket (5); and an outer end surface (3e) oriented perpendicularly to said threaded portion (3b).

16. A crank axle unit as claimed in claim 7, wherein said abutment (3c) has a continuous circular outer peripheral surface (3f).

17. A crank axle unit as claimed in claim 6, wherein said second screw ring (4) includes an unthreaded portion (4f) disposed within said bottom bracket (5).

* * * * *